//vcm// United States Patent [19]

van der Linde et al.

[11] 3,849,215
[45] Nov. 19, 1974

[54] METHOD OF HEAT TREATING WELDED ZR—CB OBJECTS

[75] Inventors: Aart van der Linde, Alkmaar; Eduard Maurice Hornsveld, Bergen, both of Netherlands

[73] Assignee: Reactor Centrum Nederland, The Hague, Netherlands

[22] Filed: Mar. 23, 1972

[21] Appl. No.: 237,402

[30] Foreign Application Priority Data
Mar. 26, 1971 Netherlands ..................... 7104075

[52] U.S. Cl. ................. 148/127, 148/20.3, 148/34, 148/133
[51] Int. Cl. .......................... C21d 1/74, C21d 9/50
[58] Field of Search ...... 148/11.5 F, 127, 133, 20.3, 148/32, 34

[56] References Cited
UNITED STATES PATENTS

| | | | |
|---|---|---|---|
| 3,121,034 | 2/1964 | Anderko et al. | 148/11.5 F |
| 3,271,205 | 9/1966 | Winton et al. | 148/133 |
| 3,332,773 | 7/1967 | Dudas et al. | 148/127 X |
| 3,341,373 | 9/1967 | Evans et al. | 148/11.5 F |

OTHER PUBLICATIONS

Welding Production, March 1967, British Welding Research Assoc., Cambridge England, pgs. 40–44.
Metallurgia Italiana, No. 2, 1970 pgs. 57–67.

*Primary Examiner*—Charles N. Lovell
*Attorney, Agent, or Firm*—Cushman, Darby & Cushman

[57] ABSTRACT

Welded objects of zirconium-columbium alloy are made corrosion-proof by thermal treatment at about 500° C under exclusion of oxygen or nitrogen.

2 Claims, 1 Drawing Figure

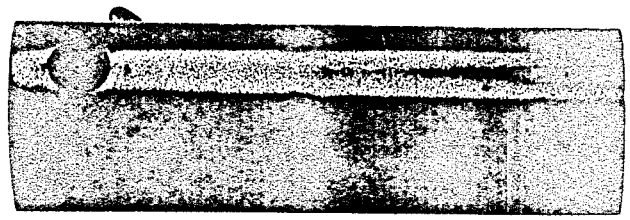
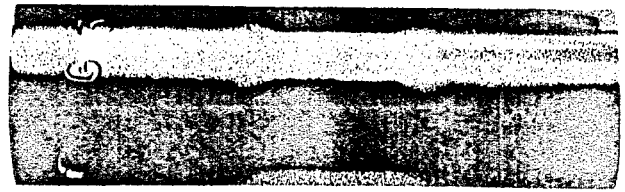

METHOD OF HEAT TREATING WELDED ZR—CB OBJECTS

The invention relates to the corrosion-proofing of objects made of Zr—Cb alloy (Cb content 0.5 – 5 percent), particularly objects which have previously been welded or which have in some other way been entirely or partly fused.

Although according to many the behaviour of the known alloy "zircalloy" in boiling-water and pressurized-water nuclear reactors is satisfactory, the low solubility of hydrogen at room temperature, <10 ppm, may be responsible for the development of cracks.

Especially when fissile rods are cooling during reactor shutdown periods, a tangential tensile stress produced in the casing by the fissile configuration of the fissile material causes at certain positions in the casing a radial orientation of the hydrides, viz. precipitated hydrogen in the form of zirconium hydride ribbons. These hydrides act as hair cracks which may widen and deepen when the reactor is again started up. In zirconium with 2.5 percent of columbium (Zr — 2.5 Cb) the solubility of hydrogen at room temperature is greater than in zircalloy, so that in fissile working times of less than three years the quantity of hydrogen absorbed precipitates 10–25 percent of the theoretically formed quantity to a lesser extent into the pipe wall. Therefore, if Zr — 2.5 Cb is used as covering for the fissile material, the risk of hair cracks is less than with zircalloy.

It has been found from corrosion tests that the rate of corrosion of Zr — 2.5 Cb is in the long run practically equal to that of zircalloy if the Zr — 2.5 Cb has received the correct thermal treatment at 475° - 600° C during at least 24 hours — 2 hours in vacuo. Under radiation conditions the rate of corrosion of zircalloy becomes greater the larger the quantity of oxygen contained in the cooling water of the reactor.

In pressurized-water nuclear reactors (PWR's) with >30 cm³H₂/kg H₂O and <0.01 ppm of oxygen, this increase is nil, but in boiling-water reactors (BWR's), with an increase of oxygen content of approximately 0.1 up to 10–30 ppm occurring from the bottom upwards along the element, there occurs not only an overall increase of the rate of corrosion by a factor of from 2 to 20 but also a greater susceptibility to the formation of detrimental oxide carbuncles.

The mechanical properties of Zr — 2.5 Cb under identical thermal treatment are, moreover, considerably better than those of zircalloy. On account of this greater strength it is possible with Zr — 2.5 Cb to give the pipes covering the fissile material a thinner wall thickness than when using zircalloy-2 as covering material.

A drawback of the Zr — Cb alloy was, however, up to the present the occurrence of accelerated corrosion after the alloy had been welded, which drawback occurred particularly under radiation conditions.

It would be possible to utilize the great technical and economic advantages of the use of Zr — 2.5 Cb and similar zirconium alloys containing columbium if the said corrosion of welds of Zr — 2.5 Cb and similar alloys could be remedied.

It is already known that the resistance of workpieces made of zirconium-columbium-tin alloys to the corrosive action of water and steam can be increased by subjecting the workpieces, after cold deformation, to a thermal treatment at temperatures ranging between 550° and 590° C.

This known combination of cold deformation, followed by the temperature treatment described, cannot of course be applied to the manufacture of welded fissile casings made of a zirconium alloy.

It is to be noted that a thermal treatment such as welding is entirely different from a mechanical treatment such as cold deformation, such mechanical treatment being, moreover, altogether inadmissible or at any rate unusual for the closing of casings of fissile elements on account of the requisite dimensional tolerances.

The composition of the zirconium-columbium-tin alloy is furthermore widely divergent from the Zr — 2.5 Cb alloy which possesses the above-mentioned good corrosion-resisting quality.

As a result of this different composition the mechanical strength and corrosion-resisting qualities are poorer than those of Zr — 2.5 Cb and similar binary Zr-Cb alloys.

According to the invention it has surprisingly been found that a thermal treatment at about 550° C is sufficient to ensure effective corrosion resistance of welds of Zr — 2.5 Cb. This is obviously a great simplification as compared with the use of zirconium-columbium-tin alloys in which the thermal treatment had to be preceded by cold deformation. The accompanying photograph, denoted as FIG. 1 (enlargement about 3.4), represents three pipe portions of Zr — 2.5 Cb alloy. All these pipe portions have in the middle a weld passing around the entire circumference of the pipe. The left-hand pipe portion is only welded, whereas the middle and right-hand pipe portion have after welding been corroded for 64 days in water at 345° C. Before the corrosion test the right-hand pipe portion had undergone a thermal treatment of 16 hours at 525° C in vacuo. It can clearly be seen that the welded area in the non-heat-treated pipe portion has a white oxide skin, whereas the heat-treated pipe portion shows an intact, black oxide skin. It is known that the white oxide skin is characteristic of a fast-corroding zirconium alloy which peels off after a short time, thereby causing pollution of the environment. An intact, black oxide skin is characteristic of a corrosion-proof zirconium alloy. After the thermal treatment, welded fissile casings made of Zr — 2.5 Cb are ready without further treatment of the work-piece for use in nuclear reactors. For welded zirconium-columbium alloys the temperature at which thermal treatment may be applied lies between 450° and 650° C.

There is a possibility that the zirconium-columbium alloy contains hafnium as well. In that case, on account of the high neutron-absorption average of hafnium, the alloy will no longer be serviceable for fissile casings. The hafnium alloy can, of course, be used for other purposes.

As a rule the zirconium-columbium alloy has been previously welded in an inert atmosphere, for instance helium or argon, or in vacuo in a welding chamber, and subsequently cooled in this rare gas or vacuum in the welding chamber.

The thermal treatment of zirconium-columbium objects which have been welded or perhaps otherwise partly fused is usually effected according to one of the undermentioned time and temperature schemes:

more than 25 hours at a temperature lower than 475°C.
```
20 - 80    hours at 475°C.
15 - 70    hours at 500°C.
10 - 60    hours at 525°C.
 5 - 50    hours at 540°C.
 1 - 40    hours at 560°C.
0.5 - 30   hours at 575°C.
```
less than 20 hours at a temperature higher than 575°C.

At temperatures ranging between those stated above the period of treatment is adapted accordingly. The selection of the temperature-time combination is determined mainly by the desired mechanical qualities of the work-piece.

The thermal treatment is carried out with exclusion of oxygen and nitrogen. Small quantities of welded objects are therefore treated in vacuo. As the maintenance of a vacuum in a large space is difficult, larger quantities or large-sized objects are treated in an inert gaseous atmosphere such as helium or argon.

The zirconium-columbium alloy preferably contains from 2 to 3 percent of columbium.

We claim:

1. A method for improving the corrosion resistance of a welded portion of an object made of zirconium base alloy containing 0.5 to 5 weight percent columbium, said method comprising thermally treating said portion by heating to an elevated temperature in the range 450° to 650° C while excluding oxygen and nitrogen and maintaining said portion at the elevated temperature for a period of time greater than 25 hours when the temperature is less than 475° C, 20 to 80 hours when the temperature is 475° C, 15 to 70 hours when the temperature is 500° C, 10 to 60 hours when the temperature is 525° C, 5 to 50 hours when the temperature is 540° C, 1 to 40 hours when the temperature is 560° C, 0.5 to 30 hours when the temperature is 575° C and for a period of time less than 20 hours when the temperature is greater than 575° C, said method being free of any operation involving deformation of said portion.

2. A method as in claim 1 wherein said joining operation has been carried out in an inert atmosphere or in a vacuum and wherein said thermal treatment is carried out in the same atmosphere as the joining operation.

* * * * *